United States Patent
Einola et al.

(10) Patent No.: US 7,366,127 B2
(45) Date of Patent: Apr. 29, 2008

(54) MONITORING CONNECTION TO USER TERMINAL IN TELECOMMUNICATIONS SYSTEM

(75) Inventors: Heikki Einola, Espoo (FI); Lauri Lahtinen, Espoo (FI); Risto Kauppinen, Helsinki (FI); Seppo Huotari, Espoo (FI)

(73) Assignee: Nokia Corporation, Espoo (FI)

( * ) Notice: Subject to any disclaimer, the term of this patent is extended or adjusted under 35 U.S.C. 154(b) by 733 days.

(21) Appl. No.: 10/372,711

(22) Filed: Feb. 25, 2003

(65) Prior Publication Data
US 2003/0224820 A1     Dec. 4, 2003

Related U.S. Application Data

(63) Continuation of application No. PCT/FI01/00747, filed on Aug. 24, 2001.

(30) Foreign Application Priority Data
Aug. 25, 2000   (FI) ................... 20001878

(51) Int. Cl.
*H04Q 7/00*   (2006.01)
(52) U.S. Cl. .................... 370/328; 370/395.5
(58) Field of Classification Search ..................... None
See application file for complete search history.

(56) References Cited

U.S. PATENT DOCUMENTS

| | | | |
|---|---|---|---|
| 5,487,071 A | 1/1996 | Nordstrand et al. | |
| 6,243,579 B1 * | 6/2001 | Kari | 455/426.1 |
| 6,396,820 B1 | 5/2002 | Dolan et al. | |
| 6,546,247 B1 * | 4/2003 | Foti et al. | 455/433 |
| 6,621,793 B2 * | 9/2003 | Widegren et al. | 370/230.1 |
| 6,654,606 B1 * | 11/2003 | Foti et al. | 455/432.1 |
| 6,763,233 B2 * | 7/2004 | Bharatia | 455/433 |
| 7,116,646 B1 * | 10/2006 | Gustafson et al. | 370/313 |
| 2002/0126696 A1 | 9/2002 | Toguchi et al. | |
| 2002/0127995 A1 * | 9/2002 | Faccinn et al. | 455/406 |

FOREIGN PATENT DOCUMENTS

| | | |
|---|---|---|
| EP | 0 946 021 A1 | 9/1999 |
| JP | 11-163858 | 6/1999 |
| JP | 2000-032176 | 1/2000 |

(Continued)

OTHER PUBLICATIONS

3G TR 23.821, V1.0.1, Technical Report, Architecture Principles for Release 2000, pp. 1-62, 2000.*

(Continued)

*Primary Examiner*—Frank Duong
(74) *Attorney, Agent, or Firm*—Squire Sanders & Dempsey L.L.P.

(57) ABSTRACT

A method for monitoring a connection to a user terminal in a telecommunications system and a telecommunications system comprising an element (CSCF) controlling a connection to a user terminal (UE) and a system part (SGSN, GGSN) providing transport of user data, which system part is separate from said controlling element, wherein a system element which knows the state of the connection to the user terminal (UE) is arranged to send an indication message to the controlling element (CSCF) indicating the state of the connection, and the controlling element (CSCF) is arranged to decide the state of the connection to the user terminal (UE) based on the indication message received.

50 Claims, 1 Drawing Sheet

FOREIGN PATENT DOCUMENTS

| | | |
|---|---|---|
| WO | WO 99/66748 | 12/1999 |
| WO | WO 00/28751 | 5/2000 |

OTHER PUBLICATIONS

Soininen, GPRS and UMTS Release 2000 All-IP option, ACM, pp. 30-37, Jul. 2000.*

Wedlun et al, Mobility Support using SIP, pp. 76-82, ACM, 1999.*

Tdoc S2-99-340, Architecture to Support Multimedia UMTS pp. 1-5, May 1998.*

Plasse, Call Control Scenarios in the "all-IP" UMTS Core Network, IEEE, pp. 322-326, 2000.*

3GPP TR 23.922 v1.0.0, Architecture for an ALL IP network, pp. 1-61, 1999.*

* cited by examiner

MONITORING CONNECTION TO USER TERMINAL IN TELECOMMUNICATIONS SYSTEM

This is a Continuation of International Application No. PCT/FI01/00747 filed Aug. 24, 2001, which designated the U.S. and was published under PCT Article 21(2) in English.

BACKGROUND OF THE INVENTION

The invention relates to monitoring a connection to a user terminal in a telecommunications system.

The present invention can be used in different telecommunications systems, such as Universal Mobile Telecommunications System (UMTS). In the following, the invention is described by way of example with reference to the UMTS, more specifically to the UMTS system being specified in the 3rd Generation Partnership Project 3GPP without restricting the invention to it.

FIG. 1 illustrates an example of the network architecture of an UMTS system. In the figure, unbroken lines between various network elements represent signalling and data interfaces whereas broken lines between network elements represent mere signalling interfaces. Main parts of the system are a radio access network providing access to user terminals UE (User Equipment) and a core network. In the example of FIG. 1, the core network comprises a Serving GPRS (General Packet Radio Service) Support Node SGSN, a GGSN (Gateway GPRS Support Node), an HSS (Home Subscriber Server) and a CSCF (Call State Control Function). The support nodes SGSN and GGSN are interconnected by a backbone network, such as an IP/ATM (Internet Protocol/Asyncronous Transfer Mode) network. It should be noted that the functionalities of the SGSN and the GGSN can also be physically combined into the same network node, in which case the operator's backbone network is unnecessary. Logically, however, the nodes are separate nodes. Core networks of another type may comprise other network elements. The core network can be connected to external networks, such as IP networks and PSTN/ISDN networks, as illustrated.

The CSCF controls call establishment and is responsible for routing calls, and comprises, for example, a function corresponding to a switching function in the intelligent network. The CSCF provides IP telephony services with end-to-end control. Signalling associated with the IP telephony, such as H.323 and SIP (Session Initiation Protocol), terminates at the user equipment and the CSCF. In other words, the CSCF is the network node in which IP telephony user equipment UE is registered and via which the signalling is transferred. The CSCF comprises IP telephony call state models, which are used for controlling call establishment with other network nodes. The CSCF can also communicate with IP telephony application servers (not shown in FIG. 1). The CSCF comprises a subscriber database, which logically corresponds to a visitor location register in the GSM system. The CSCF is responsible for producing both telephony billing information and service billing information.

For a user terminal UE, the core network GPRS interface comprises one or more individual PDP (packet data protocol) contexts which describe the packet data address the UE can use to send and receive data packets when the PDP context is active. Thus, the PDP context can be seen as a connection. The PDP context defines different data transmission parameters, such as the PDP type (e.g. X.25 or IP), PDP address (e.g. IP address), quality of service QoS, access point name APN and NSAPI (Network Service Access Point Identifier). The IP telephony is in practice invisible to the elements of the core network. For the support nodes SGSN and GGSN, the IP telephony is only a PDP context with certain service quality requirements. The signalling associated with the IP telephony terminates at the user equipment and the CSCF, so there is no need for the SGSN or GGSN to understand it.

The problem in the above arrangement is that the control and the media i.e. transfer of user data (such as voice) are distinguished, wherefore, during a connection, the controlling entity, here a CSCF, has no actual idea about the availability or state of the connection to the user terminal UE, unless it tries to send some signalling message by using the connection. Also, the media part, here an SGSN/GGSN, has no means for informing the CSCF in case there was a notable change in the availability of the connection. Once the terminal goes out of coverage, the following is expected to happen: the radio access network discovers that the radio link is not OK and informs the SGSN. Relase of the Iu interface, etc., is performed as defined in the standards. In the user terminal, the radio or GPRS part may inform the application that the connection was lost and the application in terminal goes to idle state. The CSCF will continue assuming that the connection is active until it needs to send some (e.g. an SIP) message to the user terminal; once the failure of the delivery is notified by the GPRS part to the CSCF, the CSCF may conclude that the connection must be terminated and it will go to idle. Such a message might be caused e.g. by the other party of the connection, the user of which presses the end call button of the user terminal upon noticing that the connection to the first party has been lost. The problem is, however, that the CSCF may be in a wrong kind of state for a long time, thus causing inconsistent charging, for example. Also, a case where, for example, CFNRc (Call forwarding on not reachable) is activated but no CFB (Call forwarding on busy) is activated would result in wrong actions in the CSCF. In the GSM system, for example, no similar problem exists since the control and the media are handled by a single entity, i.e. a Mobile Switching Centre (MSC).

BRIEF DESCRIPTION OF THE INVENTION

It is an object of the invention to provide a method and equipment for implementing the method so as to solve the above problems. The object of the invention is achieved by a method and an arrangement, which are characterized by what is disclosed in the independent claims 1, 18 and 35. Preferred embodiments of the invention are disclosed, in the dependent claims.

The invention is based on the idea that an indication message indicating the state of the connection to the user terminal is sent to the controlling element from a system element which knows the state of the connection, whereby the state of the connection to the user terminal can then be decided in the controlling element based on the indication message received.

According to one embodiment of the invention, information on the state of a connection to a user terminal is updated to a controlling element of the system, such as a CSCF, by sending a query message from the controlling element to some system element, such as the user terminal itself, which knows the state of the connection, whereupon the state of the connection to the user terminal can be decided in the controlling element based on a reply message received to said query message.

According to another embodiment of the invention, some system element, such as an SGSN/GGSN, which knows the state of the connection, sends an indication message to the controlling element indicating the state of the connection to the user terminal when the state of the connection changes, in which case the controlling element thus automatically gets updated information on the state of the connection to the user terminal.

According to yet another embodiment of the invention, some system element, such as the user terminal itself, which knows the state of the connection, sends at predetermined intervals an indication message to the controlling element indicating the state of the connection to the user terminal. The state of the connection to the user terminal can then be decided in the controlling element based on these indication messages received. According to a preferred embodiment of the invention, the connection to the user terminal can be considered inactive, i.e. lost, if no indication message is received in the controlling element in a predetermined time.

An advantage of the system and arrangement of the invention is that the controlling element of the system can be better kept informed on the state of the connection to a user terminal even if the controlling element is located apart from the system part providing transport of user data. As a result, possible incorrect actions by the controlling element can be better avoided.

BRIEF DESCRIPTION OF THE FIGURES

The invention will be described in the following in conjunction with preferred embodiments with reference to the attached figures, in which.

DETAILED DESCRIPTION OF THE INVENTION

The present invention can be applied to various telecommunication systems. Such systems include third generation mobile communication systems, such as the UMTS (Universal Mobile Telecommunications System). The invention will be described in the following using a 3GPP AII-IP system, i.e. a UMTS system based on IP technology and specified in a 3GPP (3rd Generation Partnership Project), as an exemplary system without restricting the invention thereto. The specifications of mobile communication systems, and those of the third generation mobile communication systems in particular, are advancing rapidly; consequently, the invention may require additional changes. All words and expressions should therefore be interpreted broadly since they are only intended to illustrate, not to restrict, the invention. The essential point of the invention is the function, not the network element in which the function is located.

Figure 1:
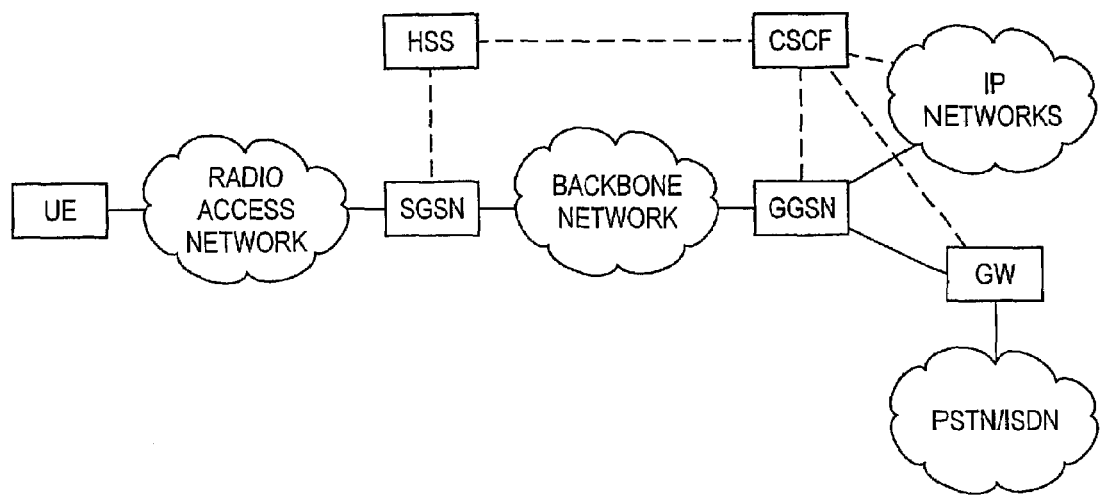
FIG. 1 is a simplified block diagram illustrating the network architecture of a UMTS system.

FIG. 1 illustrates an example of the network architecture of a UMTS system. It is to be noted that, for the sake of clarity, the figure only shows components relevant to the invention. In the figure, unbroken lines between various network elements represent signalling and data interfaces whereas broken lines between network elements represent mere signalling interfaces. Main parts of the system are a Radio Access Network RAN providing access to user terminals UE (User Equipment) and a core network. The radio access network comprises Base Stations BS under control of Radio Network Controllers RNC (not shown in the figure). In the example of FIG. 1, the core network comprises a Serving GPRS (General Packet Radio Service) Support Node SGSN, a GGSN (Gateway GPRS Support Node), an HSS (Home Subscriber Server) and a CSCF (Call State Control Function). Support nodes SGSN and GGSN are interconnected by a backbone network such as an IP/ATM (Internet Protocol/Asyncronous Transfer Mode) network.

The Serving GPRS Support Node SGSN is a node which serves the user terminal UE located in its area. In a packet radio network of the cellular type, each support node SGSN provides mobile data terminals, i.e. the user terminal UE, with packet data service in the area of one or more cells in its service area. The GPRS Gateway Support Nodes GGSN connect the operator to systems external to the GPRS network, such as IP networks. The GGSN can also be connected directly to a private company network or a host. The GGSN operates as a router between an external address and internal routing data (e.g. SGSN). It should be noted that the functionalities of the SGSN and the GGSN can also be physically combined into the same network node, in which case the operator's backbone network is unnecessary. Logically, however, the nodes are separate nodes. Core networks of another type may comprise other network elements. The core network can be connected to external networks, such as IP networks and PSTN/ISDN networks as illustrated. A gateway unit GW is used for interworking between the IP mobile core network and the traditional circuit-switched networks like the PSTN and GSM. It acts as a gateway for both media (for user data) and signaling (signaling transport).

The Home Subscriber Server HSS logically corresponds to the home location register in the GSM system, subscriber information for each subscriber being stored therein permanently or semi-permanently such that the subscriber information is combined with a subscriber identifier, which, for example, is an IMSI in the GSM system. The CSCF of the IP telephony network has a signalling connection to the HSS.

The controlling element CSCF controls call establishment and is responsible for routing calls, and comprises, for example, a function corresponding to a switching function in the intelligent network. The CSCF provides IP telephony services with end-to-end control. Signalling associated with the IP telephony, such as H.323 and SIP (Session Initiation Protocol), terminates at the user equipment and the CSCF. The Session Initiation Protocol (SIP) developed by IETF (Internet Engineering Task Force) is an application-layer control (signaling) protocol for creating, modifying and terminating sessions with one or more participants. These sessions include Internet multimedia conferences, Internet telephone calls and multimedia distribution. The H.323 standard provides a foundation for audio, video, and data communications across IP-based networks, including the Internet. H.323 is a recommendation from the International Telecommunications Union (ITU). In other words, the CSCF is the network node in which IP telephony user equipment is registered and via which the signalling is transferred. The CSCF comprises IP telephony call state models, which are used for controlling call establishment with other network nodes. The CSCF can also communicate with IP telephony application servers (not shown in FIG. 1). The CSCF comprises a subscriber database, which logically corresponds to a visitor location register in the GSM system. The CSCF is responsible for producing both telephony billing information and service billing information. It should be noted that the location of the Call State Control Function CSCF in the system may vary; the CSCF may be a separate element or located in the user terminal UE, for example. Within this application the term "controlling element" refers generally to an element or entity controlling a call, the CSCF being merely an example of such element.

For a user terminal UE, the core network GPRS interface comprises one or more individual PDP (packet data protocol) contexts which describe the packet data address the UE can use for sending and receiving data packets when the PDP context is active. Thus the PDP context can be seen as a connection. Within this application a connection can comprise two or more PDP contexts such that one PDP context is for signalling and one PDP context is for user data, for example. The PDP context defines different data transmission parameters, such as the PDP type (e.g. X.25 or IP), PDP address (e.g. IP address), quality of service QoS, access point name APN and NSAPI (Network Service Access Point Identifier). The IP telephony is in practice invisible to the elements of the core network. For the support nodes SGSN and GGSN, the IP telephony is only a PDP context with certain service quality requirements. The signalling associated with the IP telephony terminates at the user equipment and the CSCF, so there is no need for the SGSN or GGSN to understand it.

IP telephony is a general term which covers services from the standard voice telephony VoIP (Voice over IP) to multimedia applications using IP data, voice and video in the IP telephony. In addition to the IP telephony, the above-described system can support other applications, such as access to the Internet or an intranet. Similarly, an IP call refers to a call which utilizes IP-based user information (user data) flow and signalling. The user information may comprise several different components, such as voice, video image and data. In addition to calls, the IP telephony may comprise call-like services, which can be unidirectional, directed to a group (or groups) or broadcast in a given area, for example. In the IP telephony, mobile communication systems utilize new protocols, such as a WAP (Wireless Application Protocol).

Figure 2:
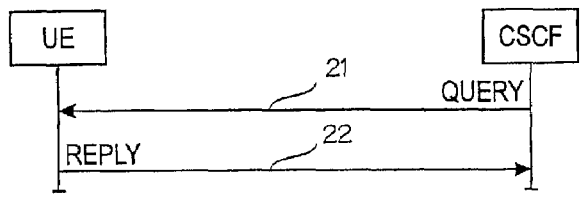
FIG. 2 is a signalling diagram illustrating the invention according to an embodiment.

According to one embodiment of the invention, information on the state of a connection to a user terminal UE is updated to a controlling element of the system, such as a CSCF, by first sending a query message 21 from the controlling element to some system element which knows the state of the connection to the user terminal as illustrated in FIG. 2. Such an element which knows the state of the connection and to which the query message 21 is sent can be the user terminal UE itself or the SGSN/GGSN or an element comprising a Service Specific Coordination Function (SCCF) at the interface between the radio access network and the SGSN, for example. The network element receiving the query message 21 then sends a reply message 22 to the controlling element CSCF. The state of the connection to the user terminal UE can be decided in the controlling element based on this reply message. The reply message as such may mean that the connection to the user terminal is active and, according to a preferred embodiment, if no reply to said query message is received in the controlling element in a predetermined time, said connection to the user terminal is considered inactive. The reply message 22 can also specifically indicate the state of the connection, i.e. active/inactive. If the connection is doomed inactive, the controlling element CSCF may take appropriate actions, e.g. decide the user terminal UE is idle and activate some appropriate state/status changing of the user terminal. The query messages are preferably sent at predetermined intervals to keep the controlling element updated on the state of the connection. The length of such a predetermined interval could correspond to the length of a basic billing period that can be 1 s, for example. Another possibility is that the length equals the length of a basic call, e.g. 120 s. The length of the interval between the query messages depends, however, on the particular system used but the exact length of the intervals is irrelevant to the basic idea of the invention. The query messages can be used e.g. during a connection, or just to find out whether the responder is reachable. According to a preferred embodiment, the system element which knows the state of the connection can send a message to the controlling element indicating that the connection has become active when said connection has temporarily become inactive and if said connection then becomes active again. It is thus possible to adopt the same status as before the temporary break of the connection or to re-establish the connection.

The above-described embodiment of the invention can be implemented by utilising the IP ping command. The Internet Protocol ping command sends an Internet Control Message Protocol (ICMP) echo request to the specified remote address. The remote device then responds to the request if it is reachable. This command can thus be used to test whether a valid path (route) exists to a destination. By specifying the user terminal UE as the destination address, the existence of an active connection to the user terminal UE can be tested. Another alternative is to use dedicated messages at the application level. Such a dedicated message (query/reply) can be an SIP message, for example.

Figure 3:
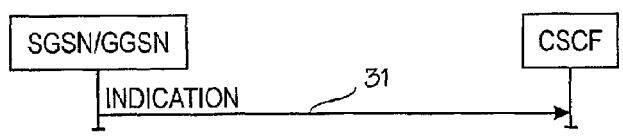
FIG. 3 is a signalling diagram illustrating the invention according to an embodiment.

According to another embodiment of the invention, some system element which knows the state of the connection sends an indication message 31 to the controlling element CSCF, as illustrated in FIG. 3, indicating the state of the connection to the user terminal UE when the state of the connection changes. The controlling element thus automatically gets updated information on the state of the connection to the user terminal. Said system element which knows the state of the connection is preferably the SGSN or the GGSN. The indication message 31 indicating that the connection to the user terminal UE has become inactive, i.e. radio connection is lost and resources released, (or active) can be a dedicated message such as an SIP message or a generic error message that the delivery of some packet to the user terminal has failed. The use of this embodiment of the invention requires that the SGSN or GGSN or a similar system element should be arranged to recognise changes in the connection to the user terminal UE, i.e. in the PDP context, and to also recognise the possible significance of the change to another PDP context in order to report them to the controlling element CSCF. Consider a situation where a PDP context A is provided for signalling and another PDP context B for user data, which contexts relate to the same connection to the user terminal UE. When the SGSN or GGSN or a similar system element notices that the context B becomes inactive, i.e. user data packets can not be delivered to the user terminal UE, it should be able to inform the controlling element CSCF that the connection (including the PDP context A for signalling) to the user terminal has become inactive. One possibility is to always send an indication to the controlling element that a PDP context to some user terminal has become inactive. The system can, however, comprise a number of separate controlling elements CSCF, and according to the state of the art, the SGSN/GGSN does not necessarily know to which controlling element CSCF the indication message should be sent. The indication message could be sent to all controlling elements but this might cause unnecessary load to the system. Another possibility is to associate relating PDP contexts (A+B) so that the SGSN/GGSN can inform the correct controlling element CSCF who uses the PDP context A for signalling when the PDP context B for user data becomes inactive. This could be implemented by e.g. adding a suitable parameter to the PDP context B (for user data) associating it with the corresponding PDP context A (for signalling) e.g. when these contexts are activated. This association information is then preferably stored in the SGSN or GGSN or in a similar system element where it can then be used as described. It is also preferable to indicate the type of the PDP context i.e. whether it is for signalling or for user data so that the SGSN/GGSN can distinguish PDP contexts for signalling and user data or at least recognise PDP contexts for user data. When the SGSN/GGSN notices that a PDP context has become inactive and also that the context was for user data, it can then look for any associated signalling PDP context from the stored association information and notify the controlling element CSCF concerned that the connection, to which these contexts relate to, has become inactive. The indication for the type of the PDP context can be implemented by setting a suitable parameter in the PDP context when it is activated and storing it in the SGSN or GGSN or in a similar system element, for example. It is obvious to a person skilled in the art that relating PDP contexts could be associated also in some other way without deviating from the basic idea of the invention.

Figure 4:
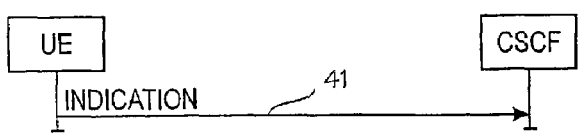
FIG. 4 is a signalling diagram illustrating the invention according to an embodiment.

According to yet another embodiment of the invention, some system element, such as the user terminal UE itself, which knows the state of the connection, sends at predetermined intervals an indication message 41 to the controlling element CSCF, as illustrated in FIG. 4, indicating the state of the connection to the user terminal. The state of the connection to the user terminal UE can then be decided in the controlling element CSCF based on these indication messages received. The indication message can be any message decided to be used for this purpose. If the controlling element CSCF receives these messages from the user terminal UE regularly, it knows that the connection to the user terminal is active. If, however, the controlling element does not receive any indication messages from the user terminal UE, it can conclude that there is something wrong with the connection to the user terminal UE. Correspondingly, according to a preferred embodiment of the invention, the connection to the user terminal can be considered inactive, i.e. lost, if no indication message is received in the controlling element within a predetermined time.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for monitoring a connection to a user terminal in a telecommunications system in which an element controlling the connection is separate from a system part providing transport of user data, the method comprising:

receiving an indication message indicating the state of the connection to the user terminal at the controlling element from a system element that knows the state of the connection, and deciding in the controlling element the state of the connection to the user terminal based on the indication message received.

2. The method of claim 1, further comprising:

sending a query message from the controlling element to the system element that knows the state of the connection to the user terminal, whereby said indication message indicating the state of the connection to the user terminal is sent in response to the query message.

3. The method of claim 2, wherein, when no reply to said query message is received in the controlling element in a predetermined time, said connection to the user terminal is considered inactive.

4. The method of claim 2, wherein said query message is sent at predetermined intervals.

5. The method of claim 2, further comprising:

receiving a message at the controlling element indicating that the connection has become active when said connection has temporarily become inactive and when said connection then becomes active again.

6. The method of claim 2, wherein said system element to which said query message is sent is the user terminal.

7. The method of claim 2, wherein said query message is sent by using an internet protocol ping command.

8. The method of claim 2, wherein said query message is a session initiation protocol message.

9. The method of claim 1, wherein said indication message indicating the state of the connection to the user terminal is sent when the state of the connection changes.

10. The method of claim 9, wherein said system element that knows the state of the connection is a general packet radio service network support node.

11. The method of claim 1, wherein said indication message indicating the state of the connection to the user terminal is sent at predetermined intervals.

12. The method of claim 11, wherein, when no indication message is received in the controlling element in a predetermined time, said connection to the user terminal is considered inactive.

13. The method of claim 11, wherein said system element that knows the state of the connection is the user terminal.

14. The method of claim 9, wherein said indication message is a session initiation protocol message.

15. The method of claim 1, wherein the system part providing transport of user data comprises a general packet radio service network.

16. The method of claim 1, wherein the controlling element comprises a call state control function.

17. The method of claim 1, wherein the system is a universal mobile telecommunications system.

18. A telecommunications system, comprising:

an element configured to control a connection to a user terminal;

a system part configured to provide transport of user data, which system part is separate from said controlling element; and a system element that knows the state of the connection to the user terminal, the system element being configured to send an indication message to the controlling element indicating the state of the connection, and wherein the controlling element is configured to decide the state of the connection to the user terminal based on the indication message received.

19. The telecommunications system of claim 18, wherein the controlling element is configured to send a query message to the system element that knows the state of the connection to the user terminal, and said system element that knows the state of the connection is configured to send the indication message in response to the query message.

20. The telecommunications system of claim 19, wherein, when no reply to said query message is received in the controlling element in a predetermined time, the controlling element is configured to consider said connection to the user terminal inactive.

21. The telecommunications system of claim 19, wherein the controlling element is configured to send said query message at predetermined intervals.

22. The telecommunications system of claim 19, wherein said system element that knows the state of the connection is configured to send a message to the controlling element indicating that the connection has become active when said connection has temporarily become inactive and when said connection then becomes active again.

23. The telecommunications system of claim 19, wherein said system element that knows the state of the connection is the user terminal.

24. The telecommunications system of claim 19, wherein the controlling element is configured to send said query message by using an internet protocol ping command.

25. The telecommunications system of claim 19, wherein said query message is a session initiation protocol message.

26. The telecommunications system of claim 18, wherein the system element that knows the state of the connection to the user terminal is configured to send the indication message to the controlling element when the state of the connection changes.

27. The telecommunications system of claim 26, wherein said system element that knows the state of the connection is a general packet radio service network support node.

28. The telecommunications system of claim 18, wherein the system element that knows the state of the connection to the user terminal is configured to send the indication message to the controlling element at predetermined intervals.

29. The telecommunications system of claim 28, wherein, when no indication message is received in the controlling element in a predetermined time, the controlling element is configured to consider said connection to the user terminal inactive.

30. The telecommunications system of claim 28, wherein said system element that knows the state of the connection is the user terminal.

31. The telecommunications system of claim 26, wherein said indication message is a session initiation protocol message.

32. The telecommunications system of claim 18, wherein the system part providing transport of user data comprises a general packet radio service network.

33. The telecommunications system of claim 18, wherein the controlling element comprises a call state control function.

34. The telecommunications system of claim 18, wherein the system is a universal mobile telecommunications system.

35. A controlling element, configured to:

control a connection to a user terminal in a telecommunications system in which said controlling element is separate from a system part providing transport of user data; and decide the state of the connection to the user terminal based on an indication message received from a system element that knows the state of the connection to the user terminal.

36. The controlling element of claim 35, further configured to:

send a query message to a system element that knows the state of the connection to the user terminal.

37. The controlling element of claim 36, further configured to:

when no reply to said query message is received in the controlling element in a predetermined time, consider said connection to the user terminal inactive.

38. The controlling element of claim 36, further configured to:

send said query message at predetermined intervals.

39. The controlling element of claim 36, wherein said system element to which said query message is sent is the user terminal.

40. The controlling element of claim 36, wherein the controlling element is configured to send said query message by using an internet protocol ping command.

41. The controlling element of claim 36, wherein said query message is a session initiation protocol message.

42. The controlling element of claim 35, wherein the controlling element comprises a call state control function.

43. The controlling element of claim 35, wherein the system part providing transport of user data comprises a general packet radio service network.

44. The controlling element of claim 35, wherein the system is a universal mobile telecommunications system.

45. A system element, configured to:

know the state of a connection to a user terminal in a telecommunications system in which a controlling element controlling a connection to the user terminal is separate from a system part providing transport of user data; and send an indication message to the controlling element indicating the state of the connection to the user terminal.

46. The system element of claim 45, wherein the system element is configured to send an indication message to the controlling element indicating the state of the connection to the user terminal when the state of the connection changes.

47. The system element of claim 46, wherein the system part providing transport of user data comprises a general packet radio service network.

48. The system element of claim 47, wherein said system element comprises a general packet radio service network support node.

49. The system element of claim 45, wherein the system element is configured to send to the controlling element at predetermined intervals an indication message indicating the state of the connection.

50. The system element of claim 49, wherein the system element is the user terminal.

* * * * *